(12) United States Patent
Shih

(10) Patent No.: US 11,220,038 B2
(45) Date of Patent: Jan. 11, 2022

(54) THERMOFORMING DEVICE

(71) Applicant: PACK & PROPER CO., LTD., Taoyuan (TW)

(72) Inventor: Kuo Shih, Taoyuan (TW)

(73) Assignee: PACK & PROPER CO., LTD., Taoyuan (TW)

( * ) Notice: Subject to any disclaimer, the term of this patent is extended or adjusted under 35 U.S.C. 154(b) by 420 days.

(21) Appl. No.: 16/231,683

(22) Filed: Dec. 24, 2018

(65) Prior Publication Data
US 2020/0055230 A1    Feb. 20, 2020

(30) Foreign Application Priority Data

Aug. 17, 2018   (TW) .................................. 107128842

(51) Int. Cl.
*B29C 51/42*  (2006.01)
*B29C 51/00*  (2006.01)
*B29C 51/46*  (2006.01)
*B29C 51/26*  (2006.01)
*B29C 51/18*  (2006.01)

(52) U.S. Cl.
CPC ............ *B29C 51/42* (2013.01); *B29C 51/002* (2013.01); *B29C 51/18* (2013.01); *B29C 51/261* (2013.01); *B29C 51/46* (2013.01)

(58) Field of Classification Search
None
See application file for complete search history.

*Primary Examiner* — Monica A Huson

(57) ABSTRACT

A thermoforming device includes two conveying units, a heating unit, a heat treatment unit and a forming unit. The conveying units define a clamp space and are adapted to move a raw material in a conveying direction. The heating unit is disposed at one side of the clamp space along a first axis, and includes a plurality of heating subunits adapted for heating the raw material. The heat treatment unit abuts against the heating base, and includes a plurality of temperature control subunits adapted for adjusting the temperature of the raw material. The forming unit is disposed proximate to the heat treatment unit and is adapted for forming the shape of the raw material.

7 Claims, 8 Drawing Sheets

THERMOFORMING DEVICE

CROSS-REFERENCE TO RELATED APPLICATION

This application claims priority of Taiwanese Patent Application No. 107128842, filed on Aug. 17, 2018.

FIELD

The disclosure relates to a thermoforming device, and more particularly to a thermoforming device that provides continuous heating.

BACKGROUND

Referring to FIG. 1, a conventional thermoforming device is adapted for treating a plurality of sheet-shaped raw materials 6 which move in a conveying direction (a). The conventional thermoforming device includes a heating unit 11, a heat treatment unit 12, and a forming unit 13. The heating unit 11 is disposed above the raw materials 6. The heat treatment unit 12 is disposed above the raw materials 6, and is disposed downstream of and spaced apart from the heating unit 11 in the conveying direction (a). The forming unit 13 is disposed above the raw materials 6, and is disposed downstream of and spaced apart from the heat treatment unit 12 in the conveying direction (a). During use, each of the raw materials 6 is moved to a position below the heating unit 11 to be heated by the heating unit 11 till the raw material 6 reaches a softening point. Then, the raw material 6 is moved to a position below the heat treatment unit 12 to undergo a heat treating process. The heat treatment unit 12 increases the temperature of the raw material 6 to a heat treating temperature, so that the shape of the raw material 6 can be formed by the forming unit 13.

However, during movement between the heating unit 11 and the heat treatment unit 12, the raw material 6 is not heated by either the heating unit 11 or the heat treatment unit 12. As a result, the temperature of the raw material 6 will drop, and a relatively large amount of energy is needed to increase the temperature of the raw material 6 to the heat treating temperature. Thus, treating the raw material 6 using the conventional thermoforming device is time-consuming and an inefficient use of energy.

SUMMARY

Therefore, the object of the disclosure is to provide a thermoforming device that can alleviate at least one of the drawbacks of the prior art.

According to the disclosure, the thermoforming device includes two conveying units, a heating unit, a heat treatment unit, and a forming unit.

The two conveying units are spaced apart in a left-right direction and are adapted to move a raw material in a conveying direction that is transverse to the left-right direction. Each of the conveying units includes two clamp subunits that are spaced apart in an up-down direction being transverse to the conveying direction and the left-right direction, and that are adapted for clamping the raw material therebetween. The clamp subunits of the conveying units cooperatively define a clamp space that is adapted for receiving the raw material.

The heating unit includes a heating base that is disposed at one side of the clamp space along a first axis extending in the up-down direction, and a plurality of heating subunits that are mounted to the heating base and that are adapted for heating the raw material.

The heat treatment unit includes a heat treatment base that abuts against the heating base and that is disposed downstream of the heating base in the conveying direction, and a plurality of temperature control subunits that are mounted to the heat treatment base and that are adapted for adjusting the temperature of the raw material.

The forming unit is disposed proximate to the heat treatment unit and is adapted for forming the shape of the raw material.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
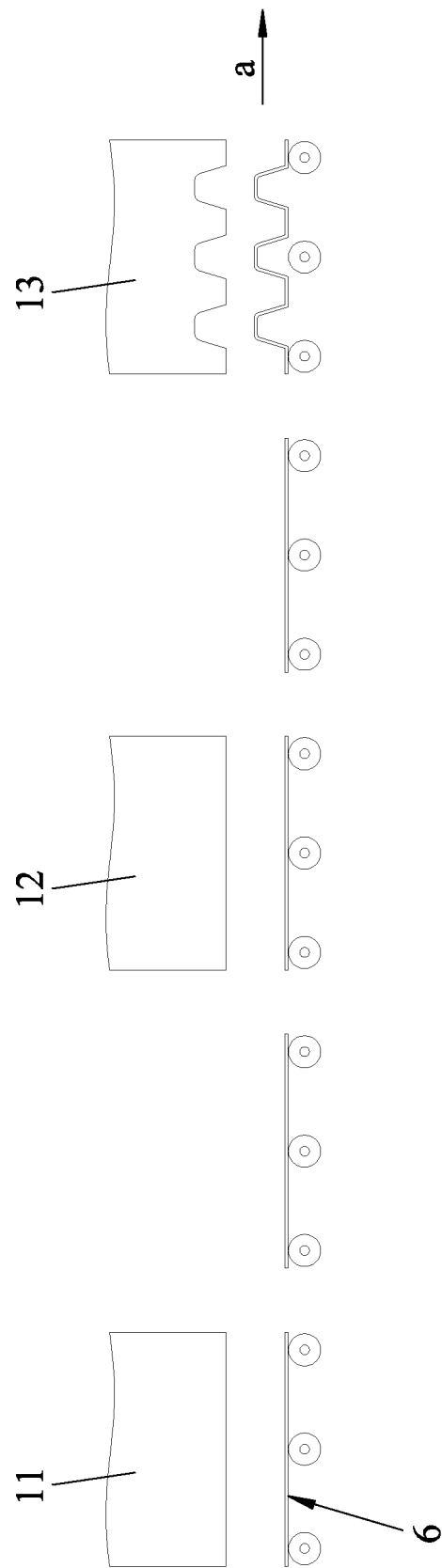
FIG. 1 is a fragmentary schematic side view of a conventional thermoforming device.
Figure 2:
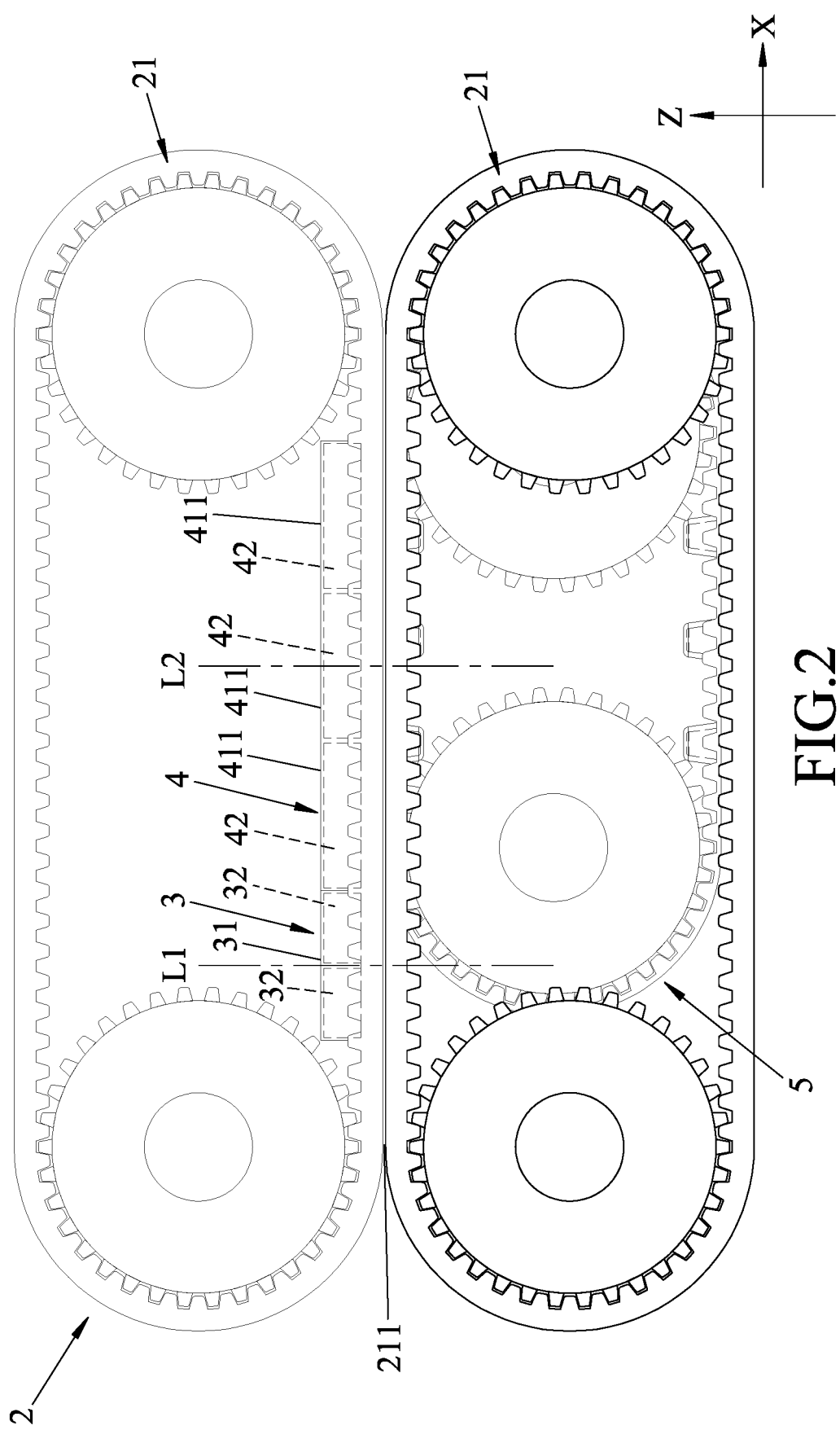
FIG. 2 is a schematic side view of an embodiment of a thermoforming device according to the present disclosure.
Figure 3:
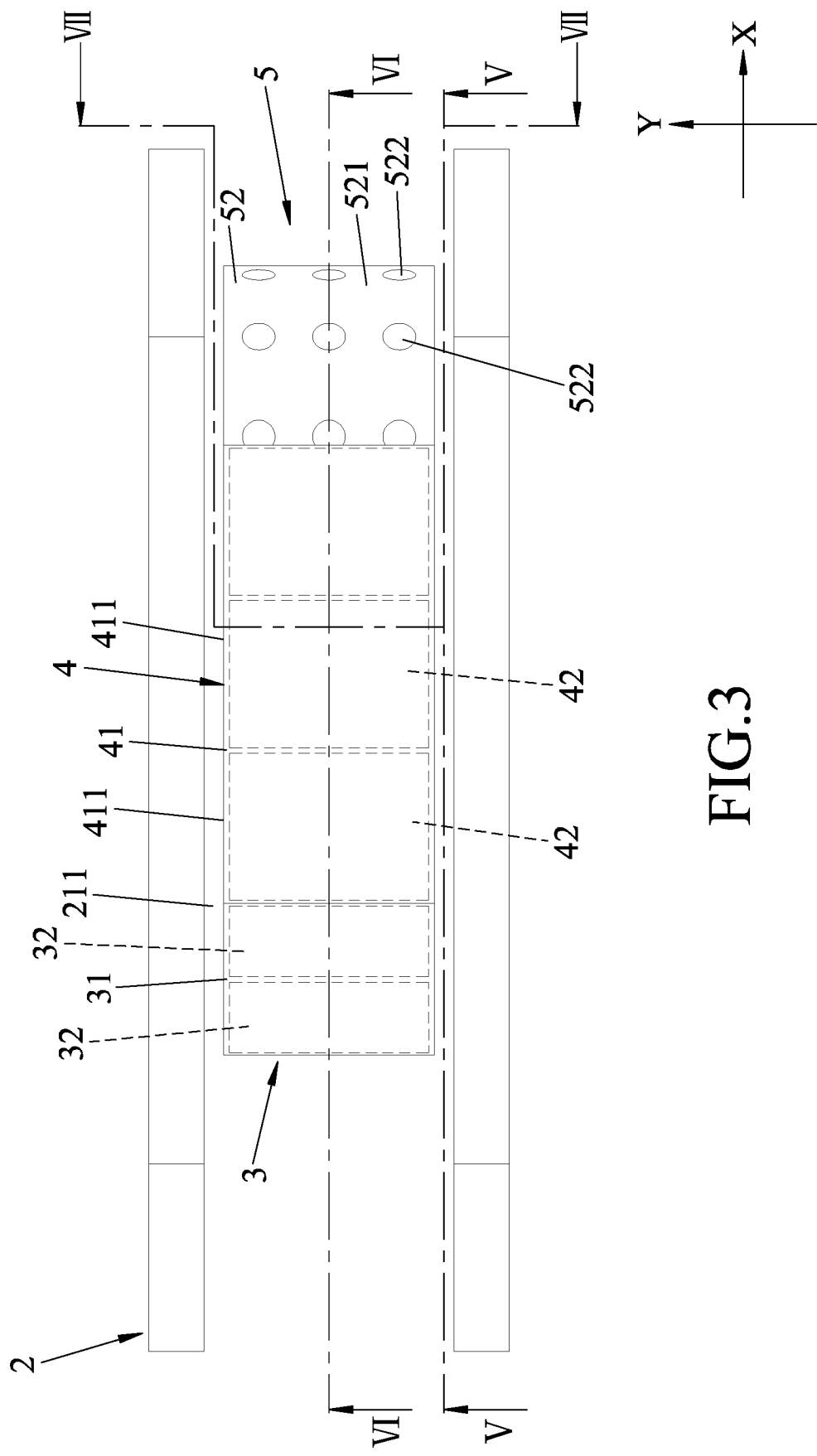
FIG. 3 is a schematic top view of the embodiment.
Figure 4:
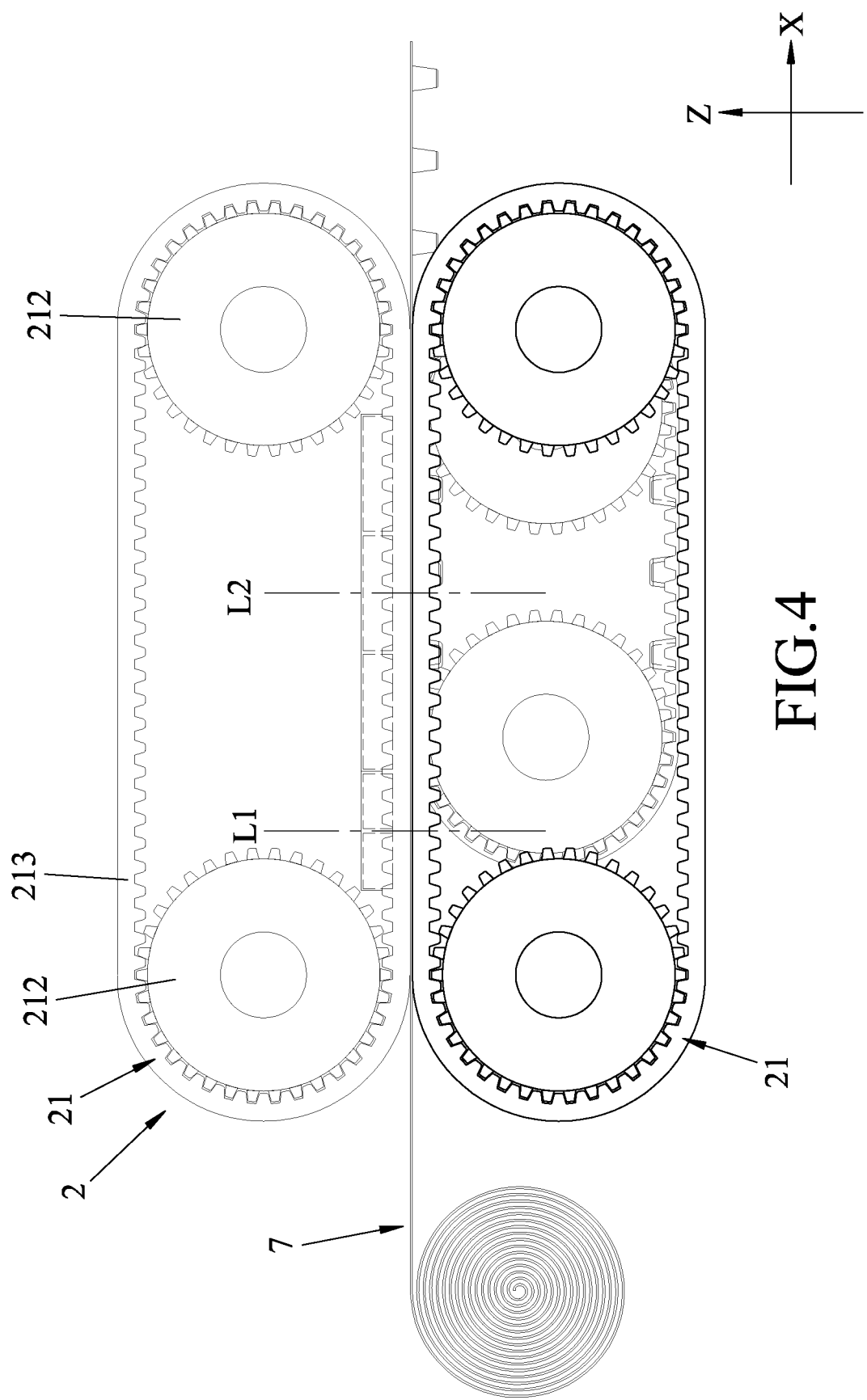
FIG. 4 is a schematic side view of the embodiment and a raw material.

Referring to FIGS. 2, 3 and 4, an embodiment of a thermoforming device according to the disclosure includes two conveying units 2, a heating unit 3, a heat treatment unit 4, and a forming unit 5.

The two conveying units 2 are spaced apart in a left-right direction (Y) and are adapted to move a raw material 7 in a conveying direction (X) that is transverse to the left-right direction (Y). Each of the conveying units 2 includes two clamp subunits 21 that are spaced apart in an up-down direction (Z) being transverse to the conveying direction (X) and the left-right direction (Y), and that are adapted for clamping the raw material 7 therebetween. The clamp subunits 21 of the conveying units 2 cooperatively define a clamp space 211 that is adapted for receiving the raw material 7. Each of the clamp subunits 21 of the conveying unit 2 includes two driving wheels 212 that are spaced apart from each other in the conveying direction (X), and a clamp belt 213 that is trained on the driving wheels 212 such that rotation of the driving wheels 212 drives a portion of the clamp belt 213 which is adjacent to the clamp space 211 to move in the conveying direction (X). The clamp belt 213 is adapted for contacting the raw material 7.

In this embodiment, the heating unit 3 includes a heating base 31 that is disposed above the clamp space 211 along a first axis (L1) extending in the up-down direction (Z), and two heating subunits 32 that are spaced apart from each other in the conveying direction (X), that are mounted to the heating base 31, and that are adapted for heating the raw material 7. It should be noted that the heating subunits 32 may be, but are not limited to, tubular electric heating elements, infrared heating elements, or a combination of the tubular electric heating elements and the infrared heating elements. In other embodiments, the quantity of the heating subunit 32 may vary as needed.

Figure 5:
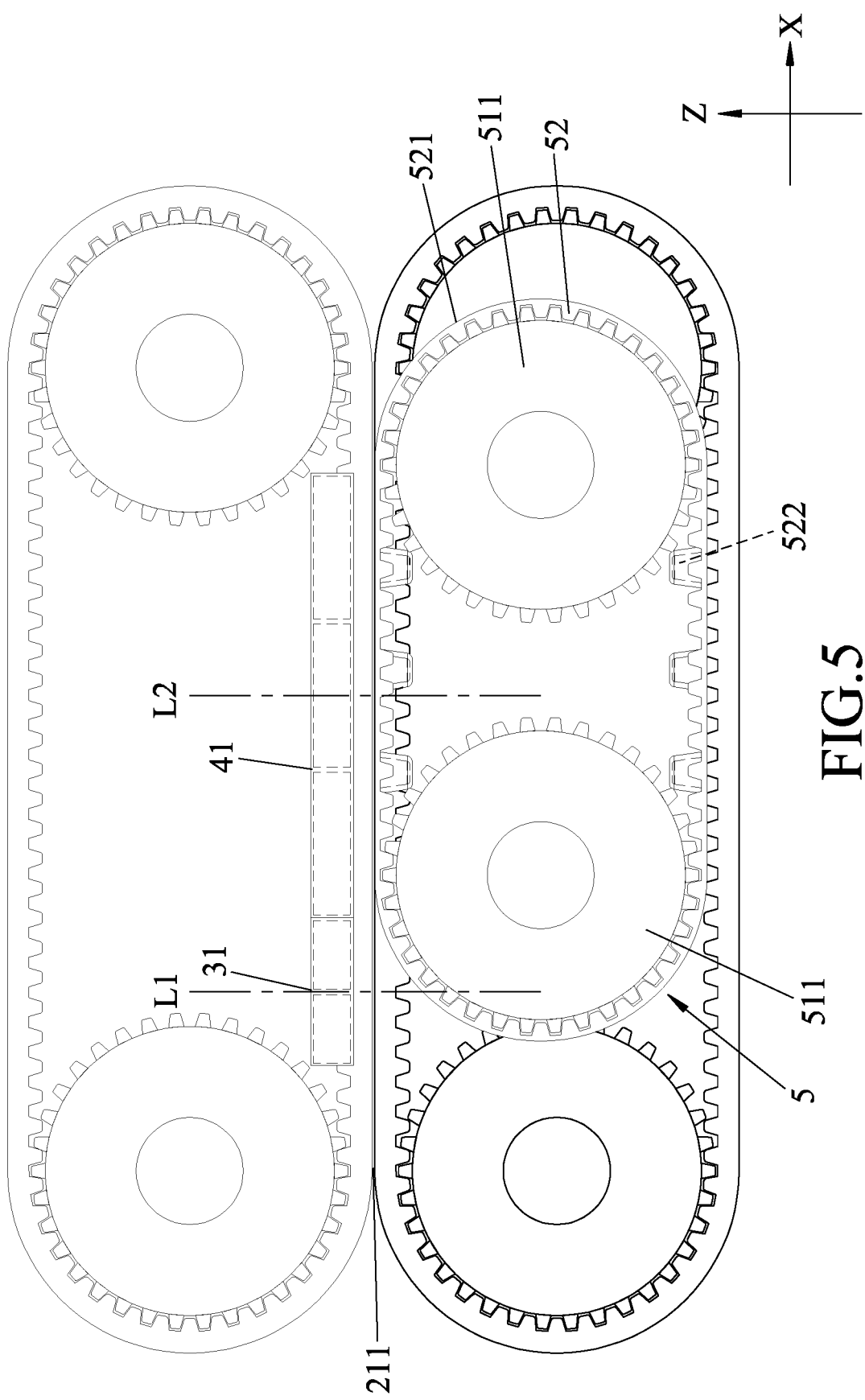
FIG. 5 is a sectional view taken along line V-V in FIG. 3.

Referring to FIGS. 3, 4 and 5, the heat treatment unit 4 includes a heat treatment base 41 and three temperature control subunits 42. The heat treatment base 41 abuts against the heating base 31, is disposed downstream of the heating base 31 in the conveying direction (X), and is disposed above the clamp space 211 along a second axis (L2) extending in the up-down direction (Z) (the first axis (L1) is parallel to the second axis (L2)). The three temperature control subunits 42 are mounted to the heat treatment base 41 and are adapted for adjusting the temperature of the raw material 7. It should be noted that the temperature control subunits 42 may be, but are not limited to, tubular electric heating elements, infrared heating elements, or a combination of the tubular electric heating elements and the infrared heating elements. The heat treatment base 41 of the heat treatment unit 4 has three receiving portions 411 that are arranged along the conveying direction (X). The three temperature control subunits 42 are disposed respectively in the three receiving portions 411. The heating unit 3 is movable along the first axis (L1) relative to the clamp space 211, and the heat treatment unit 4 is movable along the second axis (L2) relative to the clamp space 211.

Figure 6:
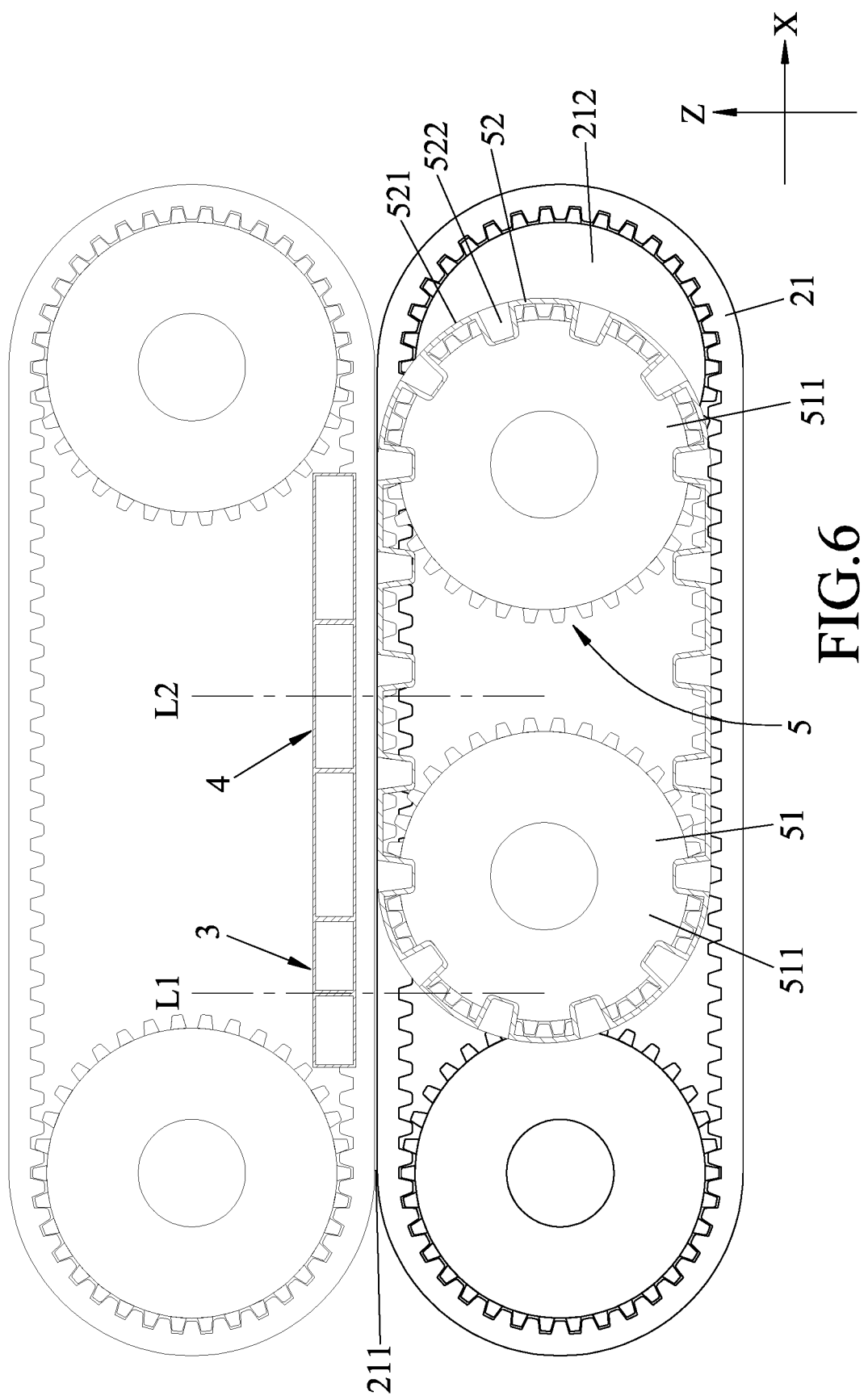
FIG. 6 is a sectional view taken along line VI-VI in FIG. 3.
Figure 7:
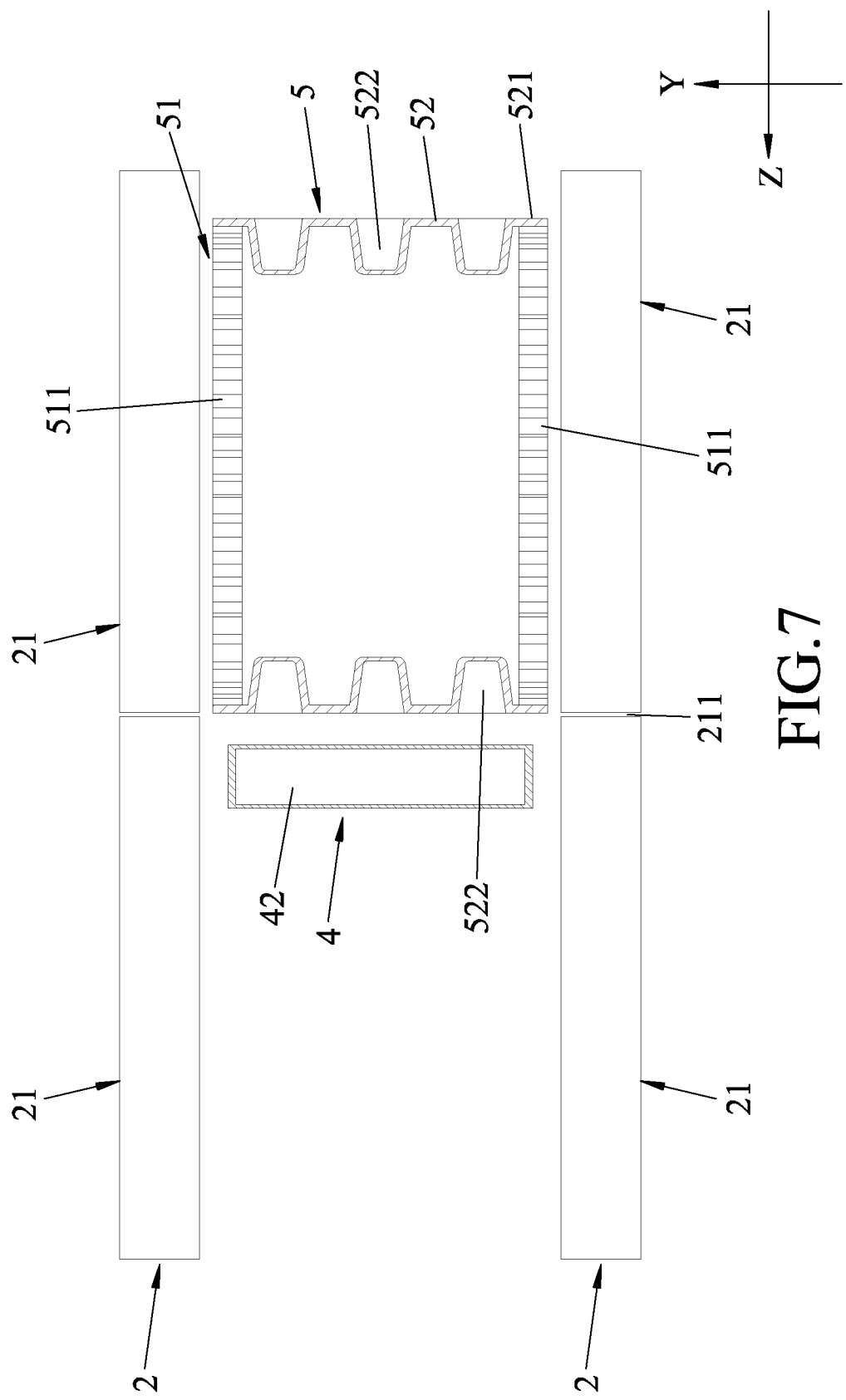
FIG. 7 is a sectional view taken along line VII-VII in FIG. 3.

Referring to FIGS. 3, 4 and 6, the heating unit 3 and the forming unit 5 are respectively disposed at two sides of the clamp space 211 which are opposite to each other along the first axis (L1). In this embodiment, the forming unit 5 is disposed under the clamp space 211 along the second axis (L2), is disposed proximate to and aligned with the heat treatment unit 4 along the second axis (L2), and is adapted for forming the shape of the raw material 7. Referring further to FIG. 7, the forming unit 5 includes two forming wheel subunits 51 and a forming belt 52. The two forming wheel subunits 51 are spaced apart from each other in the left-right direction (Y).

Each of the forming wheel subunits 51 includes two forming wheels 511 that are spaced apart from each other in the conveying direction (X). The forming belt 52 has an outer surface 521 that is adapted for contacting the raw material 7, and a plurality of forming grooves 522 that are formed in the outer surface 521, that are arranged in an array, and that are adapted for receiving a portion of the raw material 7 by means of negative pressure. The forming belt 52 is trained on the forming wheels 511 of the forming wheel subunits 51 such that rotation of the forming wheels 511 of the forming wheel subunits 51 drives a portion of the forming belt 52 which is adjacent to the clamp space 211 to move in the conveying direction (X).

Figure 8:
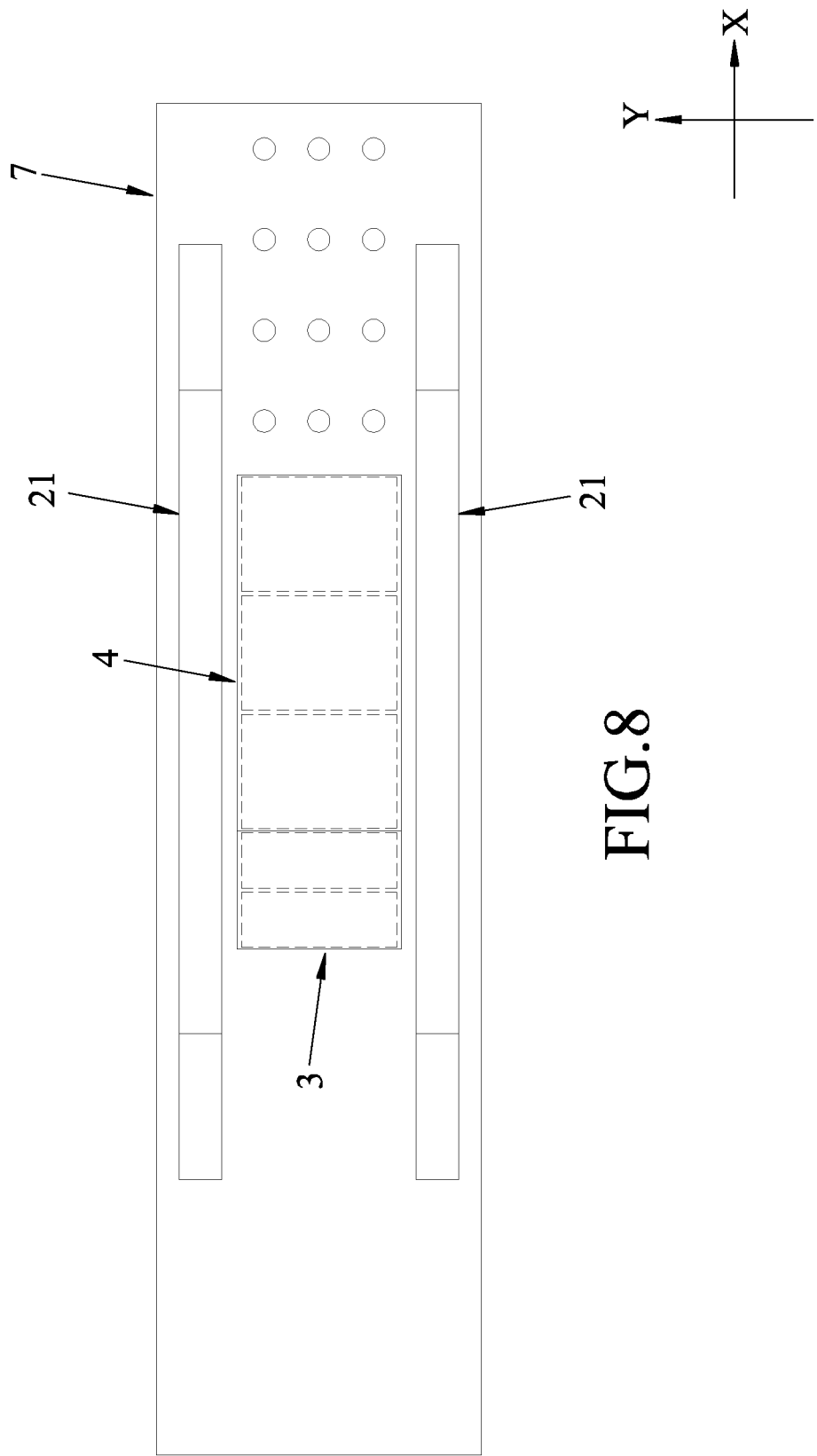
FIG. 8 is a schematic top view of the embodiment and the raw material.

Referring to FIGS. 4, 7 and 8, during operation, the clamp subunits 21 of the conveying units 2 clamp the raw material 7 within the clamp space 211, and the clamp belts 213 are driven by the rotation of the driving wheels 212 to move the raw material 7 in the conveying direction (X). The motion of a section of the raw material 7 being processed is illustrated hereinafter as an example. First, the section of the raw material 7 is moved to the position below the heating unit 3, and is continuously heated in motion by the heating unit 3 till the section is softened for the subsequent procedure. Then, the section is immediately moved to the position below the heat treatment unit 4 and above one of the forming grooves 522 of the forming unit 5. During this time, as the section is being moved in the conveying direction (X), the temperature of the section is adjusted by the heat treatment unit 4 and, at the same time, the shape of the section is formed by the forming unit 5. Finally, the section leaves the position below the heat treatment unit 4 and is separated from the forming belt 52.

Referring to FIGS. 2, 3 and 4, it should be noted that, in the present embodiment, the temperatures of the temperature control subunits 42 may be respectively controlled to switch the temperature control subunits among a continuous heating mode, a constant high-temp mode, and an enhanced cooling mode. In the continuous heating mode, the raw material 7 below the heat treatment unit 4 is continuously heated; in the constant high-temp mode, the raw material 7 below the heat treatment unit 4 is maintained at a set temperature; and in the enhanced cooling mode, the raw material 7 is cooled down before leaving the position below the heat treatment unit 4. In other embodiments, the temperatures of the temperature control subunits 42 may be respectively adjusted to meet different requirements of heat treatment.

If the raw material 7 is a crystalline material, in order to obtain a higher tensile strength or toughness of a product, the section of the raw material 7 is continuously heated after forming to be maintained at a temperature above the crystallization point of the raw material 7. Thus, the section undergoes a process of recrystallization and its mechanical properties are changed. Since the temperature of the raw material 7 is not lowered during heat treatment, the manufacturing time is shortened and the productivity is increased.

In addition, since the heating unit 3 and the heat treatment unit 4 are respectively movable along the first and second axes (L1, L2) relative to the clamp space 211, the effect of heating and heat treatment can be respectively adjusted by controlling a distance between the heating unit 3 and the raw material 7, and a distance between the heat treatment unit 4 and the raw material 7. For example, the heating unit 3 and the heat treatment unit 4 can be moved away from the raw material 7 to prevent adhesion of the raw material 7 to the forming unit 5 due to overheating.

Compared to the abovementioned conventional thermoforming device, the heating unit 3 and the heat treatment unit 4 in the present disclosure abut against each other so that the raw material 7 is immediately heat treated by the heat treatment unit 4 after being heated by the heating unit 3. In such a manner, a temperature drop of the raw material 7 between the heating unit 3 and the heat treatment unit 4 can be avoided.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A thermoforming device comprising:
   two conveying units spaced apart in a left-right direction and adapted to move a raw material in a conveying direction that is transverse to the left-right direction, each of said conveying units including two clamp subunits that are spaced apart in an up-down direction being transverse to both the conveying direction and the left-right direction, and that are adapted for clamping the raw material therebetween, said clamp subunits of said conveying units cooperatively defining a clamp space that is adapted for receiving the raw material;
   a heating unit including a heating base that is disposed at one side of said clamp space along a first axis extending in the up-down direction, and a plurality of heating subunits that are mounted to said heating base and that are adapted for heating the raw material;
   a heat treatment unit including a heat treatment base that abuts against said heating base and that is disposed downstream of said heating base in the conveying direction, and a plurality of temperature control subunits that are mounted to said heat treatment base and that are adapted for adjusting the temperature of the raw material; and
   a forming unit being disposed proximate to said heat treatment unit and adapted for forming the shape of the raw material.

2. The thermoforming device as claimed in claim 1, wherein said forming unit is disposed at another side of said clamp space which is opposite to the one side along the first axis, and is aligned with said heat treatment unit in a second axis that extends in the up-down direction.

3. The thermoforming device as claimed in claim 2, wherein:
   said heat treatment base of said heat treatment unit has three receiving portions that are arranged along the conveying direction; and
   said heat treatment unit includes three of said temperature control subunits that are disposed respectively in said receiving portions.

4. The thermoforming device as claimed in claim 3, wherein:
   said heating unit is movable along the first axis relative to said clamp space; and
   said heat treatment unit is movable along the second axis relative to said clamp space.

5. The thermoforming device as claimed in claim 4, wherein said forming unit includes:
   two forming wheel subunits that are spaced apart from each other in the left-right direction, each of said forming wheel subunits including two forming wheels that are spaced apart from each other in the conveying direction; and
   a forming belt that is trained on said forming wheels of said forming wheel subunits such that rotation of said forming wheels of said forming wheel subunits drives a portion of said forming belt which is adjacent to said clamp space to move in the conveying direction, said forming belt having an outer surface that is adapted for contacting the raw material, and a plurality of forming grooves that are formed in said outer surface and that are adapted for receiving a portion of the raw material by means of negative pressure.

6. The thermoforming device as claimed in claim 5, wherein each of said clamp subunits of said conveying unit includes:
   two driving wheels that are spaced apart from each other in the conveying direction; and
   a clamp belt that is trained on said driving wheels so that rotation of said driving wheels drives a portion of said clamp belt which is adjacent to said clamp space to move in the conveying direction, and that is adapted for contacting the raw material.

7. The thermoforming device as claimed in claim 6, wherein:
   said heating unit and said heat treatment unit are disposed above said clamp space along the first axis;
   said heat treatment unit is disposed above said clamp space along the second axis; and
   said forming unit is disposed under said clamp space along the second axis.

\* \* \* \* \*